(12) United States Patent
Yang et al.

(10) Patent No.: US 10,694,374 B2
(45) Date of Patent: Jun. 23, 2020

(54) ELECTRONIC NETWORK DEVICE

(71) Applicant: SIGNIFY HOLDING B.V., Eindhoven (NL)

(72) Inventors: Hongming Yang, Eindhoven (NL); Sandeep Shankaran Kumar, Waalre (NL); Theodorus Jacobus Johannes Denteneer, Eindhoven (NL)

(73) Assignee: SIGNIFY HOLDING B.V., Eindhoven (NL)

(*) Notice: Subject to any disclaimer, the term of this patent is extended or adjusted under 35 U.S.C. 154(b) by 217 days.

(21) Appl. No.: 15/737,104

(22) PCT Filed: May 26, 2016

(86) PCT No.: PCT/EP2016/061918
§ 371 (c)(1),
(2) Date: Dec. 15, 2017

(87) PCT Pub. No.: WO2016/202550
PCT Pub. Date: Dec. 22, 2016

(65) Prior Publication Data
US 2018/0176771 A1    Jun. 21, 2018

(30) Foreign Application Priority Data
Jun. 16, 2015    (EP) ..................... 15172271

(51) Int. Cl.
*H04L 29/06*    (2006.01)
*H04W 12/04*    (2009.01)
*H04W 12/00*    (2009.01)
*H04L 9/08*    (2006.01)
*H04W 12/06*    (2009.01)
*H04W 12/08*    (2009.01)
*H04W 84/12*    (2009.01)

(52) U.S. Cl.
CPC ........... *H04W 12/04* (2013.01); *H04L 9/0819* (2013.01); *H04L 63/18* (2013.01); *H04W 12/0023* (2019.01); *H04W 12/06* (2013.01); *H04W 12/08* (2013.01); *H04W 84/12* (2013.01)

(58) Field of Classification Search
CPC . H04W 12/04; H04W 12/0023; H04W 12/06; H04L 9/0819
USPC .......................................... 713/153
See application file for complete search history.

(56) References Cited

U.S. PATENT DOCUMENTS

2008/0109880 A1    5/2008    Shiu et al.
2013/0081113 A1    3/2013    Cherian et al.
2013/0223279 A1    8/2013    Tinnakornsrisuphap et al.
(Continued)

OTHER PUBLICATIONS

Gil Reiter, "A Primer to Wi-Fi Provisioning for IOT Applications," Texas Instruments, White Paper, 2014 (4 Pages).

*Primary Examiner* — Malcolm Cribbs
*Assistant Examiner* — Angela R Holmes
(74) *Attorney, Agent, or Firm* — Meenakshy Chakravorty

(57) ABSTRACT

An electronic network device (200) and an electronic configurator device (300) for provisioning the network device. The network device is configured to send a public key to configurator device (300) over an established first wireless (231) connection, and to receive encrypted credentials wirelessly from the configurator device. The configurator device is configured to receiving the public key over the established first wireless connection, to send credentials wirelessly encrypted with the public key to the network device over the established first wireless connection.

14 Claims, 4 Drawing Sheets

(56) References Cited

U.S. PATENT DOCUMENTS

2014/0229735 A1 8/2014 Holleis
2014/0254577 A1 9/2014 Wright et al.
2015/0071052 A1 3/2015 Hershberg et al.

ELECTRONIC NETWORK DEVICE

CROSS-REFERENCE TO PRIOR APPLICATIONS

This application is the U.S. National Phase application under 35 U.S.C. § 371 of International Application No. PCT/EP2016/061918, filed on May 26, 2016, which claims the benefit of European Patent Application No. 15172271.7, filed on Jun. 16, 2015. These applications are hereby incorporated by reference herein.

FIELD OF THE INVENTION

The invention relates to an electronic network device, an electronic configurator device for provisioning a network device, a network device method, an electronic configuration method for provisioning a network device, a computer program, a computer readable medium.

BACKGROUND

Recently there has been a fast growing and expanding interest in various "internet of things (IoT)" applications. Along with this trend, a lot of Wi-Fi-enabled devices are gaining popularity in the market, partly because of the native IP connection to Internet and the large eco-system around Wi-Fi devices such as the smartphones. Wi-Fi connectivity has also entered the lighting domain, such as the LIFX bulbs and the Osram Lightify gateway.

Before using a Wi-Fi-enabled device, a user needs to first setup the Wi-Fi connection between the new devices and the Internet through a Wi-Fi access points (AP). Such a setup process is commonly called Wi-Fi provisioning. In the lighting domain, it is also often called Wi-Fi commissioning.

Wi-Fi provisioning is a crucial entry point for any Wi-Fi device and is thus an important topic. There is still no perfect solution yet. Wi-Fi provisioning is still regarded as a difficult and sometimes confusing process by consumers of these devices.

A key aspect for Wi-Fi provisioning is to communicate the so-called Wi-Fi credentials, e.g. the SSID and password, to the new Wi-Fi devices. Most of the IoT devices such as lamps and power plugs, etc., are headless devices, i.e. there is no interface such as a touch panel, for a user to directly type in the Wi-Fi credentials. This may be resolved by employing a second device by the user, such as a smartphone, to facilitate the Wi-Fi provisioning process. Such facilitating device may be called the configurator. It is the role of the configurator then to communicate the Wi-Fi credentials to the new Wi-Fi devices.

There are a number of challenges in the communication process between the configurator and the new Wi-Fi devices. First, how can a user set up the communication to the new Wi-Fi device before the new Wi-Fi device is even able to connect to the actual Wi-Fi network. Secondly, the communication should be secure to protect the Wi-Fi credentials that need to be exchanged.

SUMMARY OF THE INVENTION

It would be advantageous to have improved provisioning of network devices.

An aspect of the invention is an electronic network device and a configurator device as claimed. The risk that an attacker can obtain the credentials for access to the wireless access point has been reduced. The credentials are only communicated in encrypted form. As the network device has access to the private key that corresponds to the public key, the network device can decrypt the encrypted credentials. An attacker does not have access to the private key and thus cannot decrypt the credentials.

The encrypted credentials may be decrypted through the private key. This may be done by decrypting the encrypted credentials directly with the private key. Alternatively, the encrypted credentials may be decrypted with a further symmetric key, which in turn may be obtained through the private key.

The credentials may be Wi-Fi credentials, e.g. the SSID and password. In an embodiment, the credentials comprise an access point identifier, e.g., an SSID and an authentication token, e.g. a password. In an embodiment, the credentials comprise one or more of a certificate, a raw public key, and a pre-shared key, e.g. for authenticating to a backend authorization server. A raw public key is an unsigned public key, e.g., a public key without a certificate.

In an embodiment, the network device comprises a controlling unit configured to receive digital commands. For example, in an embodiment, the network device as in Claim 1 is a lamp. The lamp comprises a controlling unit configured to receive digital commands for controlling a light source of the lamp through the wireless communication unit, at least when the wireless communication unit is in the client mode.

A threat to the credentials, is that an attacker may try to wirelessly transmit his own public key, just as the network device is being provisioned. Although this attack would require proper timing from the attacker, this remains a vulnerability which it would be preferred to address. One way to address this, is to package the public key of the network device in a so-called certificate, e.g., an X.509 certificate. Although this allows the configurator device to verify that the public key has been issued by some authority; it does not allow the configurator device to verify that the public key was issued to this particular device. In other words, the public key may be validly issued by the authority but for a different device, may be even a different type of device, for which it is not intended that it receive the credentials. This may be addressed by having a data storage element.

In an embodiment, the network device comprises a data storage element storing digital data, a cryptographic hash of the network device's public key being derivable from the data. The data storage element may be optically readable. In particular, the data storage element may be passive, and optically readable, e.g., not requiring power for the data storage element to be readable; e.g., a passive optically machine readable label such as a barcode or matrix code. A passive optically readable data storage element may be readable by a camera, such as a smart phone camera.

An advantage of a passive optically readable data storage element is that the element can be read before the network device is powered. For example, if a large number of network devices need to be installed, they may be read before installing. As the elements are optically read there is less risk of wireless eavesdropping or cross-talk.

Alternatively, the data storage element may be wirelessly readable. In the latter case, the wireless communication unit is configured for a first wirelessly communication protocol, while the data storage element is configured for a second wireless communication protocol different from the first wireless communication protocol.

The configurator device can verify that the hash of the received public key matches, e.g. equals, the hash obtained from the data storage element. He is thus sure that he encrypts the credentials for a public key that really belongs to this network device. A public key of an attacker will not match the hash on the data storage element. An attacker cannot replace the public-key since it is authenticated using data on the data storage element.

Moreover, the link between network device and public key is established, something which only using a certificate will not accomplish. In an embodiment, the data storage element is used and the public key is packaged in a certificate.

Optical data elements, like QR codes etc., have the advantage that they do not need an additional radio like Bluetooth (BT) or NFC. Moreover, they do not need to be powered when doing the NFC or BT connection, which may not be feasible for some network device, such as lamps.

In an embodiment, the wireless communication unit is configured not to wirelessly transmit the network device identifier before receiving the wireless connection request addressed to the network device identifier, and the network device identifier being derivable from the digital data. In this way, a configurator device cannot provision a network device if it does not have the network device identifier. This reduces attacks, e.g., by fake configurator devices. An additional advantage is that the network devices do not need to beacon as often but still can be discovered fast based on the data storage element.

In an embodiment, the digital data comprises the hash of the network device's public key, the network device identifier being derivable from the hash. Making the network device identifier derivable from the hash has the advantage that the digital data does not need to separately encode both the hash and the network device identifier; just the hash suffices. This has the advantage that the capacity of the storage element can be smaller. This is suited to optical elements as they can now be applied to smaller or curved network devices, e.g., such as lamps.

Further aspects of the invention include an electronic configurator device, a network device method, and an electronic configuration method for provisioning a network device, the configurator. A further aspect of the invention includes a system comprising a network device and a configurator device.

The configurator device may be a mobile electronic device, in particular a mobile phone. The network device may be comprised in various electronic devices, e.g., lamps, refrigerators, thermostats, radiators, etc.

A method according to the invention may be implemented on a computer as a computer implemented method, or in dedicated hardware, or in a combination of both. Executable code for a method according to the invention may be stored on a computer program product. Examples of computer program products include memory devices, optical storage devices, integrated circuits, servers, online software, etc. Preferably, the computer program product comprises non-transitory program code means stored on a computer readable medium for performing a method according to the invention when said program product is executed on a computer.

In a preferred embodiment, the computer program comprises computer program code means adapted to perform all the steps of a method according to the invention when the computer program is run on a computer. Preferably, the computer program is embodied on a computer readable medium.

Another aspect of the invention provides a method of making the computer program for the method of provisioning available for downloading. This aspect is used when the computer program is uploaded into, e.g., Apple's App Store, Google's Play Store, or Microsoft's Windows Store, and when the computer program is available for downloading from such a store.

BRIEF DESCRIPTION OF THE DRAWINGS

Further details, aspects and embodiments of the invention will be described, by way of example only, with reference to the drawings. Elements in the Figures are illustrated for simplicity and clarity and have not necessarily been drawn to scale. In the Figures, elements which correspond to elements already described may have the same reference numerals. In the drawings, FIG. 1 schematically shows an example of an embodiment of a wireless system 100, FIG. 2 schematically shows an example of a state diagram of wireless communication unit 230, FIG. 3 schematically shows an example of an embodiment of a wireless system 101, FIG. 4 schematically shows an example of provisioning methods.

LIST OF REFERENCE NUMERALS IN FIGS. 1-3

Figure 1:
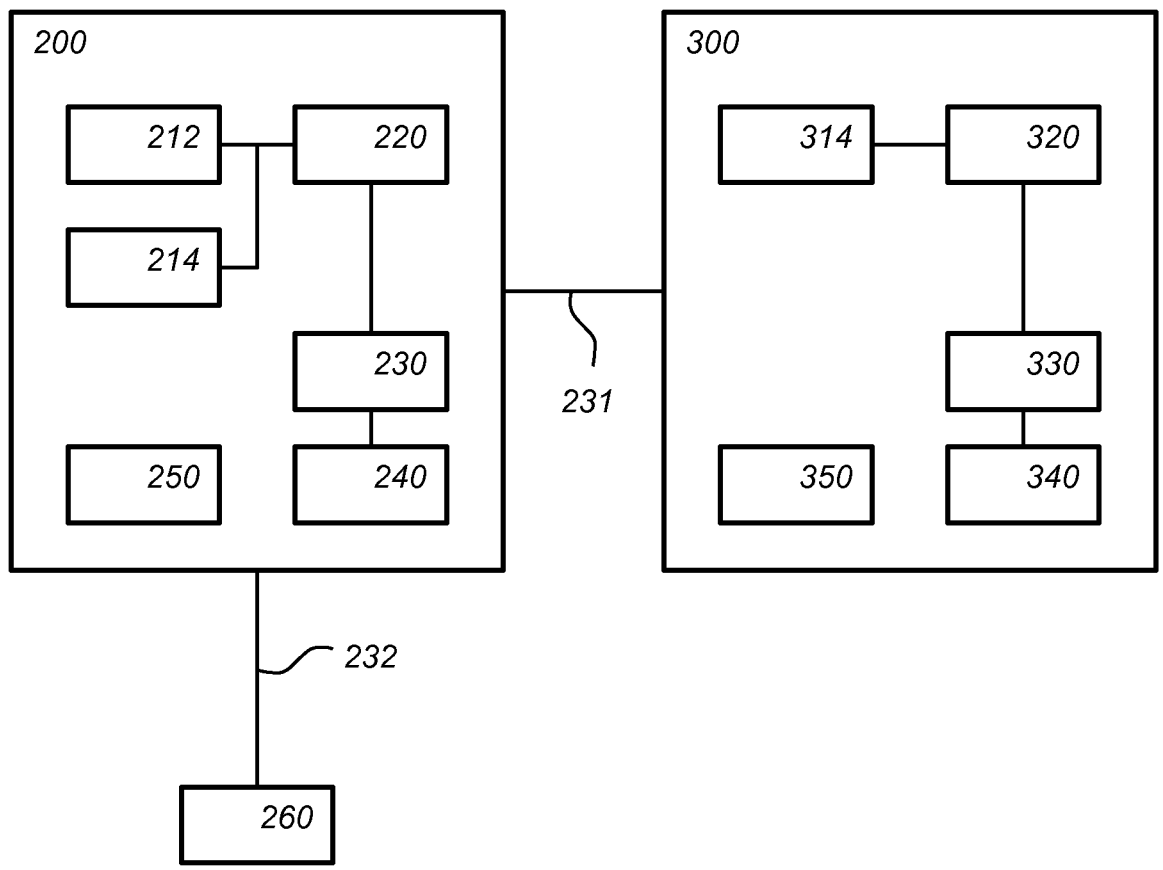

100 a wireless system
200 an electronic network device
201, 202, 203 a lamp
212 a key memory
214 a credential memory
220 a provisioning unit
230 a wireless communication unit
231 a first wireless connection
232 a second wireless connection
233 master state
234 client state
235 off state
236 credentials present
237 credentials not present
238 receiving credentials
240 a controlling unit
241 a light source
250 a data storage element
251 a QR code
260, 261 a wireless access point
300 a configurator device
301 a phone
314 a credential memory
320 a provisioning unit
330 a wireless communication unit
340 a controlling unit
350 a reader unit

DETAILED DESCRIPTION OF PREFERRED EMBODIMENTS

While this invention is susceptible of embodiment in many different forms, there are shown in the drawings and will herein be described in detail one or more specific embodiments, with the understanding that the present disclosure is to be considered as exemplary of the principles of the invention and not intended to limit the invention to the specific embodiments shown and described.

In the following, for the sake of understanding, elements of embodiments are described in operation. However, it will be apparent that the respective elements are arranged to perform the functions being described as performed by them.

Further, the invention is not limited to the embodiments, and the invention lies in each and every novel feature or combination of features described above or recited in mutually different dependent claims.

Figure 3:
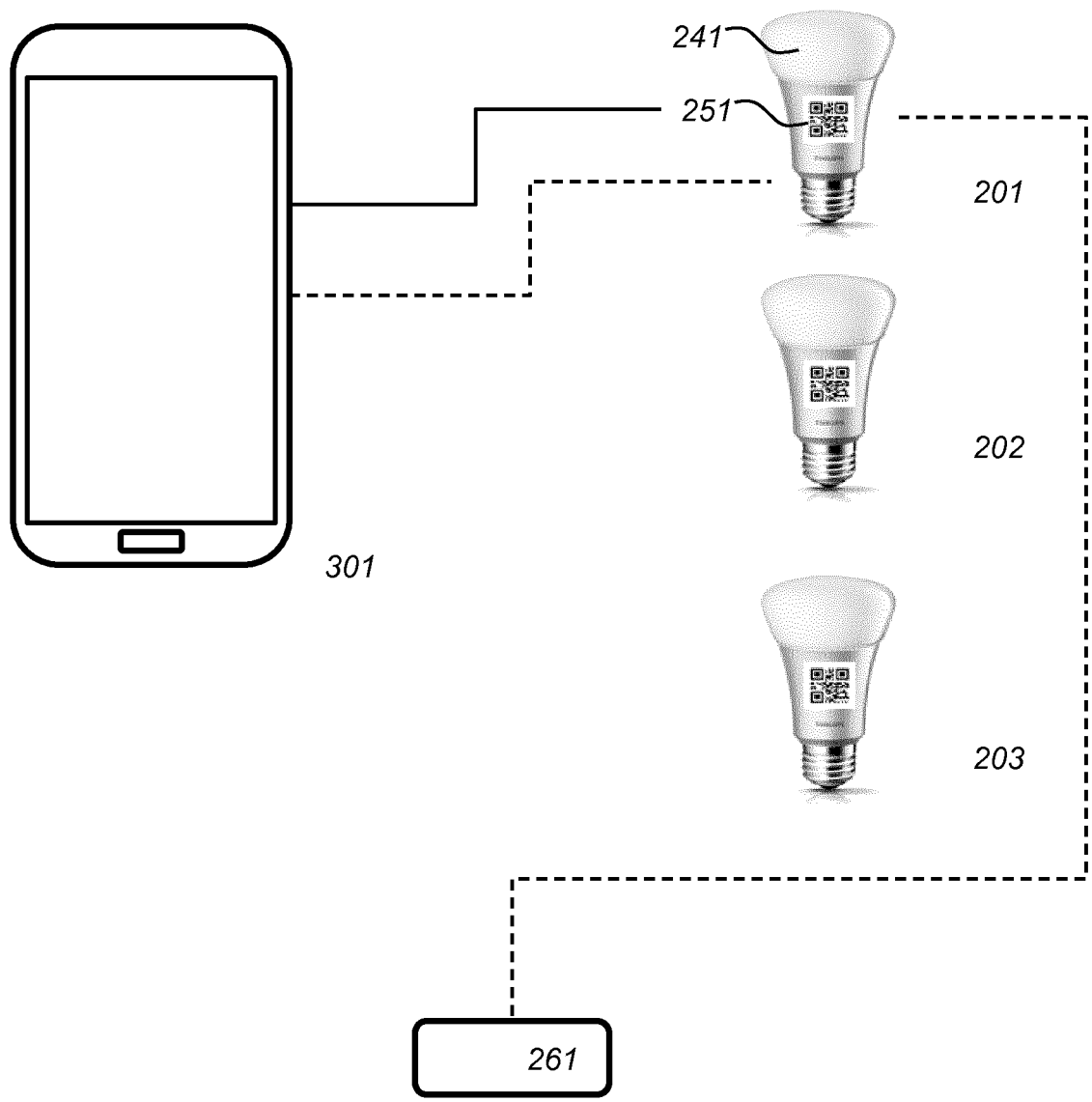

FIG. 1 schematically shows an example of an embodiment of a wireless system 100. Wireless system 100 comprises an electronic network device 200, a configurator device 300, and a wireless access point 260. FIG. 3 schematically shows an example of an embodiment of a wireless system 101. Wireless system 101 is a refinement of wireless system 100, comprising a phone 301 configured as configurator device, lamps 201, 202 and 203 configured as electronic network devices, and a wireless access point 261.

Returning to FIG. 1, electronic network device 200 which may be one of multiple electronic network devices, comprises a wireless communication unit 230 with which electronic network device 200 can connect to a wireless access point 260 if network device 200 had access to credentials needed for such connecting. Configurator device 300 is configured to provide said credentials to network device 200, and possibly also to all other electronic network devices of the multiple electronic network devices. After network device 200 received the credentials from configurator device 300, network device 200 may connect to access point 260 and engage in wireless communication over the wireless network. Various embodiments described herein, achieve different levels of security in transferring the credentials from configurator device 300 to network device 200, some of which require more or fewer resources and/or involvement of a user, say a human operator of configurator device 300.

In this application, wireless communication is intended to mean communication using electromagnetic waves, e.g., radio without using a wire; wireless communication does not include optical communication. In preferred embodiments, wireless communication is communication over Wi-Fi.

Network device 200 comprises a key memory 212, a credential memory 214, a wireless communication unit 230, and a provisioning unit 220.

Key memory 212 stores a cryptographic public key and a corresponding private key. The public and private keys are suitable for so-called asymmetric cryptography. In particular, using the public key digital data may be encrypted so that it may be decrypted by any party having access to the private key that corresponds to the public key. Interestingly, having access to only the public key does not allow decryption of data encrypted with the public key. Public and private keys are typically created together as a pair—a public/private key pair—for example, during manufacture and stored in network device 200 during a provision process. The provision process may be wired or wireless. The public/private key pair may be an RSA key pair, for example according to the PKCS #1 standard. There are many alternatives though, e.g., ElGamal, elliptic curve based asymmetric encryption, such as the Integrated Encryption Scheme, etc.

Credential memory 214 is configured for storing credentials after the credentials have been received by the network device. Initially, e.g., after network device 200 has been acquired by a user or after a reset etc., credential memory 214 does not contain credentials for access point 260. After the credentials have been received by network device 200 from configurator device 300, the credentials are stored in credential memory 214.

In an embodiment, credential memory 214 and key memory 212 may be different parts of one larger memory, say a non-volatile writable memory, such as a Flash memory. Credential memory 214 and key memory 212 may also be embodied in different types of memory; for example key memory 212 may be a write-once memory, and credential memory 214 a non-volatile writable memory which may be written more than once.

Wireless communication unit 230 is configured to engage in wireless communication with other wireless communication units. Wireless communication unit 230 is configured for some type of wirelessly communication protocol, e.g. 802.11 Wi-Fi. Although wireless system 100 is particularly suited to Wi-Fi communication, Wireless communication unit 230 may also be configured for some other type of wirelessly communication protocol, for example IEEE 802.15.4, Zigbee, or Thread. The wireless communication can indeed be any wireless channel since the communication is secured at the transport/application layer and only connectivity is required.

Wireless communication unit 230 has a master mode and a client mode. The wireless communication unit is configured to enter master mode before the credential memory stores the credentials and to enter client mode after the credential memory stores the credentials.

In the master mode, the wireless communication unit is configured to receive a wireless connection request from configurator device 300. If the connection request is addressed to a network device identifier that is associated with network device 200, wireless communication unit 230 establish a first wireless connection 231 with configurator device 300; e.g. configurator device 300 sets-up the first wireless connection 231 by sending a wireless connection request.

The network device is associated with a network device identifier. The network device identifier may for example, be stored in key memory 212. The network device identifier is unique among all the multiple network devices that may be active on the same wireless network. In practice, the network identifier may be a random number or a number used once (nonce), for example a serial number. The network device identifier may, e.g., be stored in key memory 212, or some other non-volatile memory. As will be expanded below, there is considerable advantage in having a relation between the network device identifier and the public key of network device 200; if the public key allows computing the network device identifier therefrom then storing of the network device identifier may be avoided. However, even if such a relationship is present between network identifier and public key, the network identifier may still be stored to reduce computing requirements at network device 200.

In the client mode, the wireless communication unit is configured to set up a second wireless connection with a wireless access point 260 using the credentials from the credential memory. Typically, the first wireless connection is broken once the second wireless connection is set-up.

Figure 2:
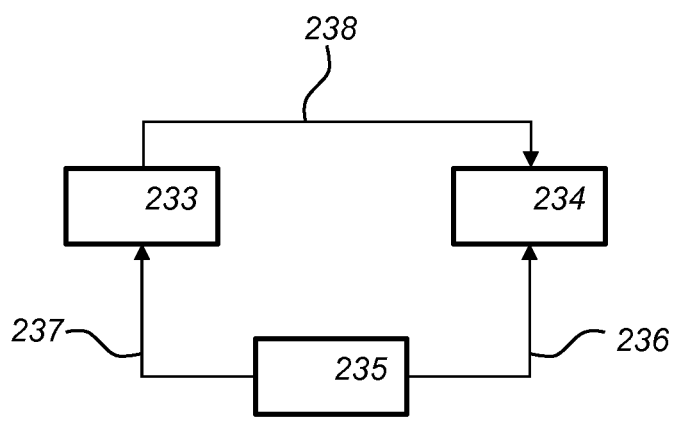

FIG. 2 schematically shows an example of a possible state diagram of wireless communication unit 230. For example, wireless communication unit 230 may comprise a state machine that governs the transition between states of wireless communication unit 230. The state machine may be configured following the state diagram of FIG. 2. A state machine may be implemented in hardware, or in software. In an embodiment of a state diagram of wireless communication unit 230 more states and/or transitions are incorporated in the state diagram.

FIG. 2 shows an off state 235, a master state 233 and a client state 234. When network device 200 is turned off, it is in the off state. When network device 200 is turned on, the wireless communication unit transitions 237 to master state 233 if credential memory 214 does not contain the credentials, and transitions 236 to client state 234 if credential memory 214 does contain the credentials. If the credentials are received while the wireless communication device is in master state 233, the wireless communication device transitions to client state 234. More transitions may be incorporated in the state diagram. For example, wireless communication unit 230 may revert to the master state upon receiving a reset signal, or if connection using the received credentials fails, say some predetermined number of times, or after some predetermined time-out. Upon reverting to the master state from the client state, credential memory 214 may erased.

In an embodiment, network device 200 is configured to erase credential memory 214 upon receiving a reset signal (e.g. via a reset message or button press), but not erase credential memory 214 in case network device 200 fails to connect to access point 260 using the credentials; in both cases the network device may return to the master state.

Returning to FIG. 1. Provisioning unit 220 is configured to send the public key from key memory 212 to configurator device 300 over the established first wireless connection 231; to receive encrypted credentials wirelessly from configurator device 300 over first wireless connection 231; and to decrypt the encrypted credentials through the private key from key memory 212 to obtain the credentials, and storing the credentials in credential memory 212.

Electronic configurator device 300 is configured for provisioning network device 200. Configurator device 300 comprises a credential memory 314, a wireless communication unit 330, and a provisioning unit 320.

Credential memory 314 stores credentials for establishing a second wireless connection with a wireless access point. The credentials may have been received in configurator device 300 from the user. For example, network device 200 may be a headless device, which does not have an interface such as a touch panel, for a user to directly type in the Wi-Fi credentials; whereas configurator device 300 may have an interface, such as a touch panel, for a user to directly type in the Wi-Fi credentials.

Wireless communication unit 330 is configured to send a wireless connection request to the network device, the network device being associated with a network device identifier, the connection request comprising the network device identifier, and establishing a first wireless connection 231 with the network device. Connection request follows the same wireless protocol for which wireless communication device 230 is configured, e.g., Wi-Fi.

Provisioning unit 320 is configured to receive the public key from the network device over the established first wireless connection 231, to encrypt the credentials through the public key, and to send said encrypted credentials wirelessly to the network device over the established first wireless connection 231.

The above described embodiments of system 100 have the advantage that the credentials cannot be eavesdropped because of the public key encrypted channel. Credentials are only revealed to authentic devices. A passive attacker who only eavesdrops on the communication between network device 200 and configurator device 300 can obtain the credentials but only encrypted with network device 200's public key. As the attacker does not have access to the corresponding private key, he cannot decrypt the encrypted credentials. It is thus avoided that the attacker gains access to the wireless network.

An active attacker however, may still be able to gain access to the credentials by impersonating network device 200. However, instead of sending the public key of network device 200, the attacker sends a public for which the attacker itself has the corresponding private key. An improvement which can partially avoid this problem is to use a so-called certificate for the public key of network device 200. For example, network device 200 may store its public key in the form of a so-called certificate, e.g., a X.509 certificate.

Thereafter, network device 200 communicates a certificate together with its cryptographic public key to configurator device 300. Using a certificate the configurator device 300 can verify that the public key was issued by an authority. After verifying the certificate, configurator device 300 can then use the public key to encrypt the credentials.

For example, if the network devices are manufactured by, say, Philips, the configurator device can verify that the public key was issued by Philips. Nevertheless, the configurator 300 cannot verify that the public key was issued to this particular network device 200. Thus any certificate obtained by an attacker, maybe for some quite different device or purpose, for which the attacker has the corresponding private key, possibly even legitimately, would suffice to make the active attack work again.

In an embodiment, network device 200 further comprises a data storage element 250. Data storage element 250 stores digital data which is readable by configurator 300. A cryptographic hash is derivable from the digital data, e.g. the digital data encodes the hash. The cryptographic hash is also referred to as the hash value, or the message digest, etc. Cryptographic hash functions have the property that it is practically infeasible to find two different messages with the same hash. Examples of hash functions include SHA-1, SHA-256, RIPEMD-160, Keccak, Skein, etc.

If required a hash value may be cropped to a shorter length. A shorter hash provides less protection against impersonation by an attacker, but on the other hand requires fewer resources in network device 200. In a lower security embodiment, the hash value is 80 bits, e.g. the final 80 bits of a sha-256 hash. In a higher security embodiment, the hash value is 256 bits, e.g. the full 256 bit output of a sha-256 hash.

In an embodiment of configurator device 300 suited for a network device 200 having data storage element 250, configurator device 300 comprises a reader unit 350. Reader unit 350 is configured to read the digital data from data storage element of the network device. The cryptographic hash of the network device's public key is derived from the digital data, e.g., by configurator device 300, e.g. by the provisioning unit 320 or reader unit 350.

Provisioning unit 320 is configured to compute a hash for the public key received from the network device, and verify that said computed hash equals said derived hash, the wireless communication unit does not send the encrypted credentials to network device 200 if the verification is unsuccessful.

Producing a cryptographic hash for a public key requires access to said key. Thus a data storage element with the correct hash ensures that the person who created the data storage element had access to the public key. This prevents that the credentials are encrypted for a public key that is not the public key of network device 200, but instead was chosen by an attacker, or was issued for a different purposes and/or for a different device. The data storage element thus helps to verify the relationship between a public key that is received wirelessly and the physical device for which the credentials are intended. Provision unit 320 is configured not to transmit the encrypted credentials before a successful verification between a hash computed from the public key received from network device 200 and the hash derived from the digital data obtained from data storage element 250.

In other words, configurator device 300 can increase trust that the received public key is valid and not the key of a hacker and that the received public key belongs to this particular network device. An attacker cannot replace the public-key since it is authenticated using data on the data storage element. Packing the public key in a certificate allows to verify only the origin of the public key; using only certificates may still allow the credentials to be leaked to another device which should not be getting them. Certificates do not provide the fine-grained visibility that the device is your device that is being configured.

There are several ways to implement the data storage element.

In an embodiment, the data storage element is wirelessly readable, e.g., over wireless radio waves. The wireless communication unit 230 and 330 are configured for a first wirelessly communication protocol, the data storage element being configured for a second wireless communication protocol different from the first wireless communication protocol. Wireless communication units 230 and 330 may comprise an antenna for radio communication.

For example, the first wireless communication protocol may be Wi-Fi. For example, in an embodiment, the first wireless communication protocol may be 802.15.4, Zigbee, or Thread.

For example, in an embodiment the second wireless protocol is NFC or Bluetooth. The data storage element may be a wirelessly readable label, e.g. an Rfid tag The Rfid tag may be passive. For example, the passive tag may not have an internal power source but uses the electromagnetic (EM) field transmitted by reader unit 350 to power its internal circuit. It relies not on a transmitter but on backscattering to transmit data back to reader unit 350.

The first wireless communication protocol may be any wireless channel as the communication is secured at the transport/application layer and only connectivity is required. The second wireless can similarly be any wireless communication. If the data storage element is wirelessly readable, one has to be careful that it cannot be spoofed since the verification of the public key is based on the trust in the hash which is derived from the data storage element. The distance over which the data storage element is readable should be limited based on the attack model, the expected sophistication of attacks on the system, the value of the credentials, etc. In an embodiment, the second wireless communication protocol is not a long distance wireless channel. For example, in an embodiment, the range of the second protocol is less than 10 meter, less than 1 meter, etc.

In an embodiment, the data storage element uses visible light communication (VLC) to transmit the digital data to the configurator device 300. VLC is a type of optical wireless communication. For example, the network device may be a lamp comprising a light source, say light source 241. The light source may, e.g., be a fluorescent light source or an LED light source. In this embodiment, the data storage element is configured to manipulate light transmitted by the light source to encode the digital data, e.g., to encode the hash of the public key. For example, the data storage element may be configured to repeatedly transmit the digital data. For example, the data storage element may be configured to cease transmitting the digital data if wireless communication unit 230 is in the client mode.

In an embodiment, the data storage element is optically readable, e.g., an optical machine-readable representation of the digital data. For example, the data storage element may be a barcode or a matrix barcode, e.g. a QR Code (Quick Response Code). The data storage element may be applied to the network device as a sticker, a label, a self-adhesive label, etc. The data storage may also be printed on network device 200. The data storage element may be a tamper-evident label, arranged to be damaged if the data storage element is removed from the network device 200. In an embodiment of configurator device 300, the data storage element is optically readable and the reader unit is arranged to optically read the data storage element. For example, the reader unit may be a camera; for example, configurator device 300 may be a phone and reader unit 350 may be a camera of the phone.

An optically readable data storage element does not need an additional radio like Bluetooth (BT) or NFC would. An optically readable data storage element does not need to be powered when doing the NFC or BT connection to configurator device 300.

FIG. 3 shows multiple lamps, including lamps 201, 202 and 203. The lamps comprise network device 200 and an optical data storage element; in this case a QR code (e.g. codes 251). The multiple lamps may comprise different public/private key pairs and have different data in the digital storage element, e.g. different QR codes.

It was found that storing the complete public key in a data storage element 250, especially along with a certificate, is complicated and costly in practice, but this can be avoided by employing a cryptographic hash function, which hashes the public-key to a shorter length public key hash. In embodiments, it is sufficiently secure and authenticated for network device 200 to use an out-of-band mechanism such as the data storage element 250, to communicate the public key hash to configurator device 300 without using an explicit certificate.

Given the short length, low-rate out-of-band methods to communicate the public key hash may be adopted, e.g. through the use of a QR code. The QR code conveys the public key hash of the new network device to the configurator device. The hash of the public key of network device 200 may be represented in the digital data.

In an embodiment, data storage element 250 comprises data that allows configurator device 300 to verify that the public key received wirelessly from network device 200 comes from network device 200, i.e., from the same network device from which the digital data was obtained (e.g. cryptographic data for authenticating the public key). In an embodiment of such data, the digital data comprises a hash of the public key of network device 200. The hash may have been further processed, e.g., signed using a private key of a signing authority. Such a signature may be verified using the public key of the signing authority, thus recovering the hash value.

In an embodiment, the network device identifier is derivable from the digital data. Wireless communication unit 230 is configured not to wirelessly transmit the network device identifier before receiving the wireless connection request addressed to the network device identifier. For example, wireless communication unit 230 may be configured not to wirelessly transmit the network device identifier when in client mode and not when in master mode before receiving a wireless connection request addressed to the network device identifier.

Configurator device 300 is configured to derive the network device identifier from the digital data obtained from data storage element 250. Wireless communication unit 330 is configured to address the wireless connection request to the network device identifier derived from the digital data. In an embodiment, configurator device 300 is configured for a network device which does not wirelessly transmit the network device identifier before sending the wireless connection request comprising the network device identifier.

Having the network device identifier obtained from the data storage element and not have network device identifier transmitted wirelessly ensures that an attacker who does not have access to data storage element 250 cannot communicate with the network device before the authorized user (who does have access to the data storage element) initiated the communication to network device 200. For example, an attacker could try to impersonate an authorized configuration device with his smart phone and try to get network device 200 to connect to a wireless network under control of the attacker, e.g. using credentials for a wireless network of his own, say to his mobile phone. This will not work since the attacker does not have the network device identifier. Not sending out the SSID by network device 200 before receiving a connection request with the correct SSID is known as the hidden mode of an access point or Wi-Fi network.

In an embodiment, wireless communication units 230 and 330 are configured for Wi-Fi and the network device identifier is an SSID (Service Set Identifier). Additional advantage is that the network devices do not need to be beaconing as often but still can be discovered fast based on the data storage element. Wireless communication unit 230 may be configured in master mode to periodically send a so-called beacon frame. The beacon interval, e.g. the time between successive beacon frames, may be set to more than 100 ms, e.g. to 500 ms or more, 1000 ms or more. This will have little impact on the ability of configurator device 300 to connect to network device 200 as it has the network device identifier, e.g., the SSID.

In an embodiment, wireless communication device 230 is configured to use a longer beacon interval before receiving a correctly addressed connection request than after; e.g. 1000 ms before and 100 ms. This has the advantage that the multiple network devices do not overcrowd the radio traffic, yet do not cause compatibility problems with configurator device, such as some smart phones that rely on beacon frames for power management. In an embodiment, wireless communication device 230 is configured not to send beacon frames before receiving a correctly addressed connection request, and to send beacon frames thereafter. Note that configurator device 300 does not rely on beacon frames to discover wireless communication unit 230, as it obtains the network device identifier from data storage element 250.

When there are a large number of network devices in range, such as hundreds or even thousands of such devices, for example, in a professional lighting system, a beacon interval of 100 ms would result in a large number of beacon messages transmitted, resulting in crowded radio communication traffic. The radio communication performance will hence be reduced. The Wi-Fi provisioning process will also be negatively affected. Using the hidden mode of an access point also avoids that a large number of access points would show up as available, if the all the lamps broadcast their SSID in beacon frames.

In an embodiment, data storage element 250 a password may be derivable from the digital data to protect communication between network device and configurator device 300, this protects against an attacker trying to take over the communication with the network device after the public key is sent.

In an embodiment, the network device identifier, e.g. an SSID associated with the network device is comprised in the digital data of data storage element 250. Encoding a hash of the public key and the network device identifier separately is undesirable as it leads to an increase in the length of the digital data. For instance, in the case of a QR code, it is then needed to increase the density of the QR code or make the QR code larger. However, for network devices, such as lamps and power plugs, it is hard to print a high density QR code on it. For other low bandwidth method, such as audio, NFC, visible light communications, etc., the increase of sequence length will introduce additional delays.

In an embodiment, the digital data comprises the hash of the network device's public key wherein the network device identifier is derivable from the hash. This has the effect that the capacity of the data storage element can be smaller. For example, in an embodiment, the data storage element has a capacity of less than or equal to 512 bit. In fact, in an embodiments the data storage element may have a capacity of less than or equal to 256 bit. In particular, the data storage element may be an optically readable data storage element, such as a matrix barcode, having a capacity of 256 bit or less. This in turn leads to a smaller optically readable element which may be applied to smaller and/or curved objects, e.g., as indicated in the lamps FIG. 3. In an embodiment, the data storage element has a capacity as least as large as the size of hash of the network device's public key, but less than twice the size of hash of the network device's public key.

In an embodiment of configurator device 300, reader unit 350 is arranged to read digital data from data storage element 250 of network device 200, configurator device 300 being configured to derive a cryptographic hash of the network device's public key and the network device identifier from the data. In particular, the cryptographic hash of the network device's public key may be derived first and the network device identifier may be derived from the hash. The latter allows lower capacity data storage elements 250, e.g., smaller matrix barcodes which may, e.g., be applied to smaller devices and/or curved devices. Wireless communication unit 330 is configured to address the wireless connection request to the network device identifier derived from the digital data. The network device is configured not to wirelessly transmit the network device identifier before the configurator device 300 sends the wireless connection request comprising the network device identifier. According to the Wi-Fi protocol, the communication following the wireless connection request may include the network device identifier, e.g., the SSID. Provisioning unit 320 may be configured to compute a hash for the public key received from the network device, and verify that said computed hash equals said derived hash; wireless communication unit 330 is configured to only send the encrypted credentials to the network device if said verification is successful.

There are a number of ways to derive a network device identifier from a hash. For example, the hash may be mapped according to a mapping function to a network device identifier. For example, the mapping function may be base conversion function, e.g., mapping a number in base 2 (the public key hash in binary) to a number having a base equal to the number of allowable characters; the latter may be represented as a character string. Assuming 62 allowable characters and 32 allowable places in the network device identifier, this allows encoding of 190 bits (as 32 $\log_2 62 > 190$).

For computationally restricted devices, a simpler conversion method is desired. For example, in an embodiment, the network device identifier is derivable from the hash by grouping the hash into a sequence of smaller bit strings and converting each bit string to a character of the network device identifier. For example, the smaller bit string may have a fixed length, e.g. the fixed length strings may be 6 bits. The mapping from strings to characters may be a 1-to-1 mapping. The latter is not necessary. For example, some characters may correspond to multiple bit strings. The latter avoids the need to have a power-of-2 number of allowable characters. The hash may be padded so that it has a number of bits that is a multiple of the fixed length. In an embodiment, the fixed length may be 5 or 6. The first allows encoding of hashes of 32*5=160 bit in 32 characters using $2^5$==allowable characters. This encoding needs only alphabetic characters. A fixed length of 6 allows encoding of hashes of 32*6=192 bit using $2^6$=64 allowable characters. If the number of allowable characters is less than 32 and 64 respectively, the maximum encodable hash size correspondingly diminishes.

Interestingly, in an embodiment, the hash is padded. The padding may be arranged so that the initial character of the network device identifier is taken from a restricted set, e.g., only alphabetic or alphanumeric characters.

In an example, the network device identifier, e.g., an SSID, has a maximum length (len) of characters and each character may have a number of different values (vals). For example len may be 32, and val may be 62 (digits and lower and upper case letters). The hash may be mapped to the network device identifier by considering each character as digit having vals different values, which would give the SSID a numeric range of (vals^len). The mapping function may be a base conversion algorithm for converting a binary 160 bit number to a number with base equal to vals.

Below an additional encoder is given that converts a SHA-1 hash value into a legal SSID identifier. A SHA-1 hash value has length: 20 bytes, or 160 bits. The maximum SSID length for Wi-Fi is 32 characters. We assume that 64 different characters are supported (digits and lower and upper case letters, and two punctuation marks, say '–' and '—'). The supported characters are represented by 6 bits. The encoding process may proceed as follows:
  (1) Pad 2 bits to the 20-bytes Hash value 00̲1010001011010 . . .
  (2) Group every 6 bits and encode the bits into a character according to the mapping table Encoding results: 162 bits are encoded into a sequence of 27 characters which is less than 32 characters. The encoding of the supported characters to 6 bit strings may be chosen so that encoded SSID always has a letter as starting character. The latter may be required by some implementations of wireless communication devices. For example, the 160 bit hash may be padded with a prefix of two zero-bits; The mapping may have bit sequences 000000-001111 represent letters, e.g. the letters a-p; the bit sequences 010000-111111 representing the digits, punctuation, and remaining letters.

The above method encodes an entire SHA-1 hash of 160 bits into an SSID string that is accepted as a valid SSID by Wi-Fi access points. Such a hash is highly likely to be unique given the high collision resistance of SHA-1. The above method may also be used with a different hash function. If the different hash function produces a larger bit sequence, e.g. SHA-256, the sequence may be shortened to a portion thereof, e.g. to 160 bit, e.g. by taking the first or last 20 bytes thereof.

In an embodiment, the public key of each network device is hashed into a shorter sequence through a cryptographic hash function. Such a hashed public key is at the same time interpreted as a string of characters using an encoding, representing the SSID that the device is using when in hidden mode for Wi-Fi provisioning. In an embodiment, the digital data provided by the data storage element is a public key hash, and at the same time also the SSID to be used in the hidden mode.

In principle, configurator device 300 can directly send out the credentials, encrypted using the public key. However, a more secure method is that the configurator 300 and the new device 200 us a new dynamic encryption key for the communications, e.g., through a hand-shake process such as the TLS protocol.

The encrypted credentials which network device 200 receives wirelessly from configurator device 300 are decrypted by the network device 200 through the private key to obtain the credentials. There are several ways to protect the confidentiality of credentials by encryption using public/private key encryption. A first way is to encrypt the credentials with the public key itself by configurator device 300. In this case the encrypted credentials are decrypted with the private key itself to obtain the credentials. For example, in an embodiment, provisioning unit 220 is configured to decrypt the encrypted credentials with the private key.

The credentials may also be encrypted with a symmetric key that is shared between the network device 200 and configurator device 300.

For example, in an embodiment, provisioning unit 220 is configured to receive encrypted key data through the first wireless connection 231 from configurator device 300, decrypting the encrypted key data with the private key of network device 220 obtaining key data, deriving a symmetric key from the key data and decrypting the encrypted credentials with the symmetric key. In this case, provisioning unit 320 is configured to encrypt key data with the public key of network device 220 obtaining encrypted key data, deriving a symmetric key from the key data and encrypting the encrypted credentials with the symmetric key to obtain encrypted credentials. The encrypted key data and the encrypted credentials are sent by configurator device 300 to network device 200 over the first wireless connection.

The key data and further key data may be a random bit string, selected by the configurator device 300. For example, the key data and further key data may each be 128 bit long, e.g. at least 64 bit long. Deriving the symmetric key may be applying a cryptographic hash, or other key derivation function to the key data. Alternatively, the key data itself may be taken as the symmetric key. The key data may be the pre-master key from TLS protocol, e.g. described in RFC 5246 or 2246. There is also the possibility for key generation on both ends, e.g., like Diffie-Hellman.

In an embodiment, network device 200 may select further key data, e.g., a further random bit string and send it to configurator 300, e.g., together with the public key of network device 200. Configurator device encrypts and sends its key data as indicated above, however, the symmetric key is derived from the key data and the further key data, e.g., by applying a key derivation function, etc., to both the key data and the further key data, e.g., to their concatenation. Using further key data avoids replay attacks, in which an attacker replays the communication of the configuration device 300 to set network device 200 back to previous credentials.

In an embodiment, network device 200 comprises a controlling unit 240. Controlling unit 240 is configured to receive digital commands through wireless communication unit 230, at least when the wireless communication unit is in the client mode. For example, the command may be received through access point 260, e.g., over second wireless connection 232. In an embodiment, configurator device 300 may comprise a controlling unit 340 configured to send digital commands to network device 200. The command may control some aspect of network device 200. For example, in an embodiment, the network device is a lamp, and the digital commands control a light source of the lamp, e.g., turning the lamp source on and off, changing the color of the light source, dimming the light source etc. The light source may be comprised in the lamp; Or the light source may not be comprised in the lamp, but the lamp may be connectable to a light source.

The digital commands may be protected, e.g., authenticated and/or encrypted using cryptographic mechanism unrelated to the provision process. However, in an embodiment, the protection of the digital commands may be improved by linking it, at least in part, to the public key or the symmetric key obtained through the public key, as mentioned above. For example, a digital command may be encrypted with the network device's public key or symmetric key. This protects the confidentiality of commands. For example, a digital command may be authenticated using a message authentication code (MAC) created with the symmetric key. This protects the authentication. The digital commands may be sent and/or protected from the configurator device 300.

In an embodiment, the credentials comprise a password required for access to the wireless access point and/or an identifier of the wireless access point. For example, the wireless access point may be a wireless access point configured for the Wi-Fi protocol. The credentials may be the access points SSID and password. In an embodiment, the credentials may comprise a username and password, or security certificate. In an embodiment, the credentials may be RADIUS access credentials, see e.g. RFC 2865. The credentials may be configured for WPA-Enterprise mode.

The credentials may comprise one or more of the following group: Password, Pre-shared key, Raw public key, Certificate comprising a public key, User Identifying information.

Typically, network device 200, configurator device 300, phone 301, lamps 201-203, each comprise a microprocessor (not shown) which executes appropriate software stored at the respective devices; for example, that software may have been downloaded and/or stored in a corresponding memory, e.g., a volatile memory such as RAM or a non-volatile memory such as Flash (not shown). Alternatively, the devices may, in whole or in part, be implemented in programmable logic, e.g., as field-programmable gate array (FPGA). The devices may be implemented, in whole or in part, as a so-called application-specific integrated circuit (ASIC), i.e. an integrated circuit (IC) customized for their particular use. For example, the circuits may be implemented in CMOS, e.g., using a hardware description language such as Verilog, VHDL etc.

In an embodiment, network device 200 comprises a key memory circuit, a credential memory circuit, a wireless communication circuit, a provisioning circuit. The device 200 may comprise additional circuits, e.g., controlling circuit. Network device 200 may also comprise a data storage element circuit; the latter may be replaced by a non-electric data storage element, e.g., a sticker, a printed code etc. In an embodiment, configurator device 300 comprises a credential memory circuit, a wireless communication circuit, a provisioning circuit. Configurator device 300 may additionally comprise a reader circuit and a controlling circuit. The reader circuit may further comprise a lens. The wireless communication circuits may comprise an antenna.

The circuits implement the corresponding units described herein. The circuits may be a processor circuit and storage circuit, the processor circuit executing instructions represented electronically in the storage circuits. The circuits may also be, FPGA, ASIC or the like.

Once the network device 200 has been successfully provisioned, the network device 200 can communicate with other devices through access point 260, e.g., to device on the same wireless LAN. In a simpler embodiment, the network device is configured fixedly for this access point. However, in an embodiment of network device 200, provisioning unit 220 is configured to remove the credentials from credential memory 212 upon receiving a wireless reset message. The wireless reset message may be received over access point 260, e.g., through connection 232. If access points 260 fails, a new access point with same credentials may be set-up in order to send the reset message. In an embodiment, the network device comprises a reset button, the network device being configured to erase the credentials from the credential memory when the reset button is engaged. These embodiments may be combined, allowing both a reset message and a reset button.

In an embodiment of configurator device 300, reader unit 350 is arranged to read multiple digital data from multiple data storage elements of multiple network devices. For example, phone 301 may scan the QR codes of lamps 201, 202 and 203, before the lamps are turned on; e.g., even before the lamps are installed. Wireless communication unit 330 is configured to derive multiple cryptographic hashes of the multiple network device's public keys and multiple network device identifiers from the multiple data. Configurator device 3000 is configured to provision the multiple network devices.

Below a description is given of a further embodiment in which the network devices are lamps. Reference is made to FIG. 3. FIG. 3 shows a configurator device in the form of phone 301, e.g., a smart phone, and multiple network devices in the form of lamps, shown are lamps 201, 202, and 203. A data storage element has been applied to lamps in the form of a matrix barcode, in this example a QR code, e.g. QR code 251. The QR codes of lamps 201, 202 and 203 are different. The lamps include a light source, e.g. light source 241. The network device may also be a luminarie; the luminaire comprising network device 200.

In operation, phone 301 scans the QR codes of lamps 201, 202 and 203. This has been illustrated in FIG. 3 by a solid line, running from phone 301 to lamp 201. From the digital data thus obtained, phone 301 derives hashes of their public key. Form the hashes network device identifiers for the lamps are derived. This dual use of a hash, both to confirm the public key and to inform a configuration device of a network device identifier allows the QR code to be relatively small. A small QR code may be easier applied to a lamp. After the QR codes have been scanned, they may be installed and turned on. Once turned on the lamps operate as access points in hidden mode, allowing wireless connection provided the connecting device knows the network device identifier of the particular lamp.

Phone 301 connects wirelessly to each of the lamps in turn, indicated by a dashed line running from phone 301 to lamp 201. For example, phone 301 sends a connection request to lamp 201 using the correct network device identifier for lamp 201. Lamp 201 responds by sending the public key of lamp 201. Phone 301 verifies the public key received from lamp 201 with the hash obtained from the matrix barcode of lamp 201. If these match, e.g. are equal, the phone 301 encrypts the credentials of a wireless access point 261 with the public key and sends the encrypted credentials to lamp 201. Lamp 201 decrypts the credentials through its private key. Lamp 201 may proceed to connect to access point 261 using the credentials; this is illustrated by a dashed line running from lamp 201 to access point 261. After provisioning lamp 201, phone 301 can proceed to provision the other lamps, e.g. lamps 202 and 203. For example, phone 301 may comprise a memory for storing digital data obtained from the multiple lamps.

Below a description is given of further embodiments in which the network devices are Wi-Fi devices. A group of new Wi-Fi devices is provisioned. For each new Wi-Fi device, a unique short data sequence is created to undertake two roles simultaneously: the sequence is the public key hash, and at the same time also the SSID to be used in hidden mode. Such short data sequence is printed on the surface or on the package of the Wi-Fi device via a QR code or bar code; alternatively, such sequence is communicated to the configurator through a low data rate communication method, such as NFC. During Wi-Fi provisioning, each new Wi-Fi device is running in hidden mode without broadcasting the SSID before a connection request to the correct SSID has been received. During Wi-Fi provisioning, the configurator scans the QR code on each device or receives the unique sequence from the low data rate communication method. Thereafter, the configurator starts to connect to the obtained list of SSIDs and communicates the Wi-Fi credentials to those new Wi-Fi devices in a secure manner enabled by a public key cryptographic protocol. The applicable Wi-Fi devices are not limited to lamps and methods of communicating the SSID and public key information are not limited to the use of a QR code.

During the Wi-Fi provisioning process, the configurator first scans and stores all the QR codes before the Wi-Fi devices are installed and powered on. Hence this process is safe for an installer. The Wi-Fi devices do not broadcast their SSID as they operate in the hidden mode in the provisioning process, at least not before receiving a correctly addressed connection request. The Wi-Fi devices need not even broadcast any beacon messages. The configurator may undertake Wi-Fi provisioning automatically one by one to all the Wi-Fi devices from the list of the QR code recorded in the configurator. The QR code for each device may be unique and act a double roles in the provisioning process. The first role of the data sequence is that of SSID of the Wi-Fi device in hidden mode. The second role of that the data sequence is also the public key hash of the corresponding Wi-Fi device. Hence, at least half of the physical space is saved to print the QR code on the Wi-Fi devices. Such physical space is quite scare for many devices such as lamps and power plugs. The access point may be a Wi-Fi router having an SSID and which is password protected.

Figure 4:
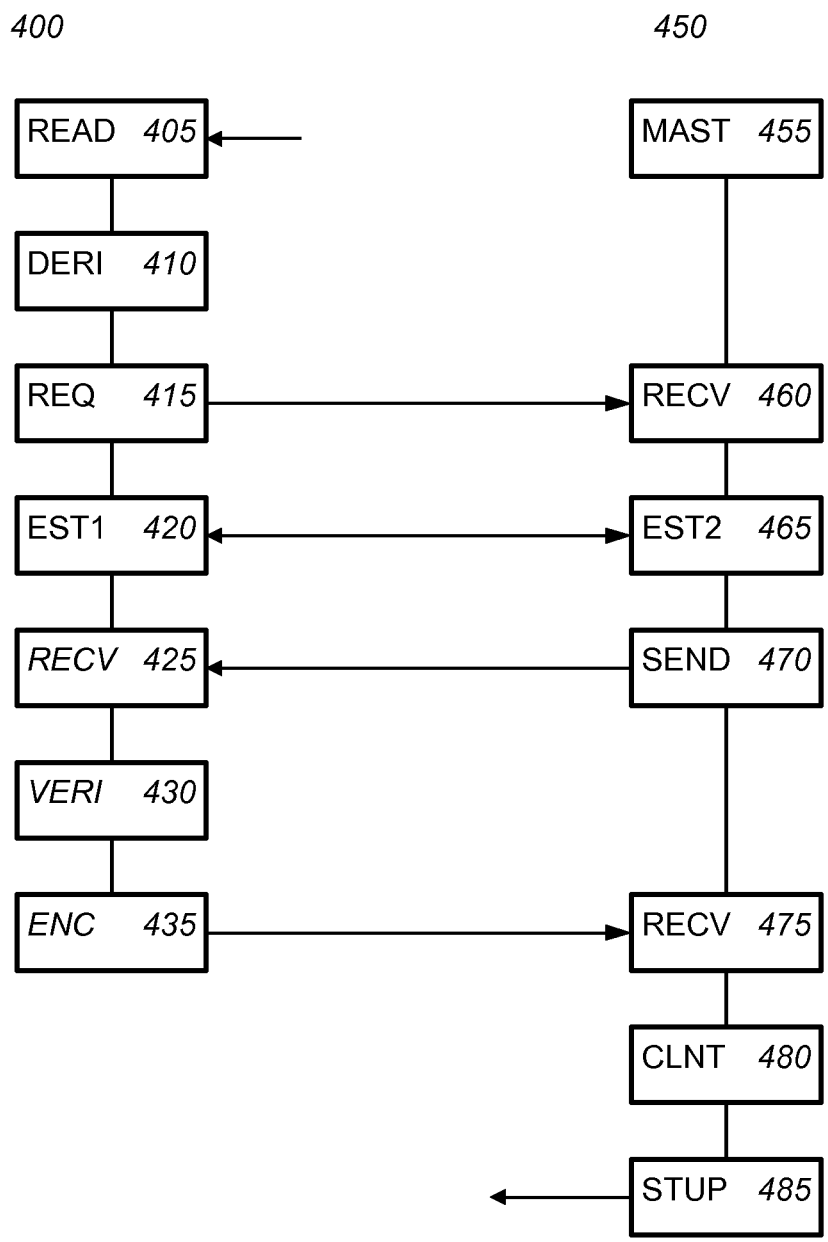

FIG. 4 illustrates an electronic configuration method 400 for provisioning a network device and a network device method 450. The two methods may interact with each other, and FIG. 4 shows this interaction. Method 400 may be performed by configuration device 300. Method 450 may be performed by network device 200. FIG. 4 show one sequence in which the methods may be performed, time running from the top of FIG. 4 to the bottom.

Method 400 comprises:

reading (READ, 405) digital data from a data storage element of a network device, deriving (DERI, 410) a cryptographic hash of the network device's public key and the network device identifier from the digital data. Possibly, the network device identifier is derived from the hash of the network device's public key, sending (REQ, 415) a wireless connection request to the network device. The wireless connection request is addressed to the network device identifier derived from the digital data, establishing (420) a first wireless connection with the network device, receiving (RECV, 425) the public key from the network device over the established first wireless connection, compute (VERI, 430) a hash for the public key received from the network device, and verify that said computed hash equals said derived hash, the wireless communication unit only sending said encrypted credentials to the network device if said verification is successful.

encrypting (ENC, 435) credentials through the public key, and sending said encrypted credentials wirelessly to the network device.

Method 450 comprises:

entering (MAST, 455) a wireless communication unit to master mode before a credential memory stores credentials, receiving (RECV, 460) a wireless connection request from a configurator device, if the connection request is addressed to the network device identifier, establish (EST2, 465) a first wireless connection with the configurator device, sending (SEND, 470) a public key to the configurator device over the established wireless connection, receiving (RECV, 475) encrypted credentials wirelessly from the configurator device, decrypting the encrypted credentials through the private key to obtain the credentials, and storing the credentials in the credential memory, entering (CLNT, 480) the wireless communication unit to client mode after the credential memory stores the credentials, setting up (STUP, 485) a second wireless connection with a wireless access point using said credentials.

Methods 400 and 450 include steps that are optional as indicated above. Such elements may be removed from methods 400 and/or 450 to obtain methods corresponding to embodiments described elsewhere herein.

Many different ways of executing the methods are possible, as will be apparent to a person skilled in the art. For example, the order of the steps can be varied or some steps may be executed in parallel. Moreover, in between steps other method steps may be inserted. The inserted steps may represent refinements of the method such as described herein, or may be unrelated to the method. For example, elements 430 and 435 may be executed partially in parallel. Moreover, a given step may not have finished completely before a next step is started.

A method according to the invention may be executed using software, which comprises instructions for causing a processor system to perform method 400 or 450. Software may only include those steps taken by a particular sub-entity of the system. The software may be stored in a suitable storage medium, such as a hard disk, a floppy, a memory etc. The software may be sent as a signal along a wire, or wireless, or using a data network, e.g., the Internet. The software may be made available for download and/or for remote usage on a server. A method according to the invention may be executed using a bitstream arranged to configure programmable logic, e.g., a field-programmable gate array (FPGA), to perform the method.

It will be appreciated that the invention also extends to computer programs, particularly computer programs on or in a carrier, adapted for putting the invention into practice. The program may be in the form of source code, object code, a code intermediate source and object code such as partially compiled form, or in any other form suitable for use in the implementation of the method according to the invention. An embodiment relating to a computer program product comprises computer executable instructions corresponding to each of the processing steps of at least one of the methods set forth. These instructions may be subdivided into sub-routines and/or be stored in one or more files that may be linked statically or dynamically. Another embodiment relating to a computer program product comprises computer executable instructions corresponding to each of the means of at least one of the systems and/or products set forth.

Figure 5A:
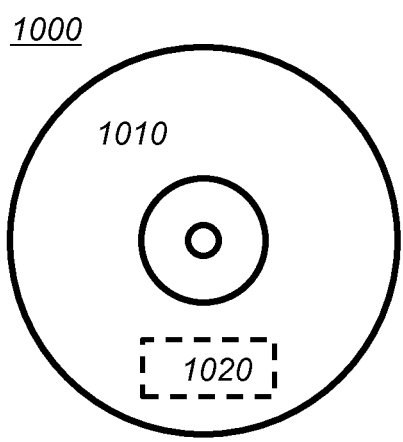
FIG. 5a schematically shows a computer readable medium having a writable part comprising a computer program according to an embodiment, FIG. 5b schematically shows a representation of a processor system according to an embodiment.

FIG. 5a shows a computer readable medium 1000 having a writable part 1010 comprising a computer program 1020, the computer program 1020 comprising instructions for causing a processor system to perform a network device method or a network device provisioning method, according to an embodiment. The computer program 1020 may be embodied on the computer readable medium 1000 as physical marks or by means of magnetization of the computer readable medium 1000. However, any other suitable embodiment is conceivable as well. Furthermore, it will be appreciated that, although the computer readable medium 1000 is shown here as an optical disc, the computer readable medium 1000 may be any suitable computer readable medium, such as a hard disk, solid state memory, flash memory, etc., and may be non-recordable or recordable. The computer program 1020 comprises instructions for causing a processor system to perform the network device method or the network device provisioning method.

Figure 5B:
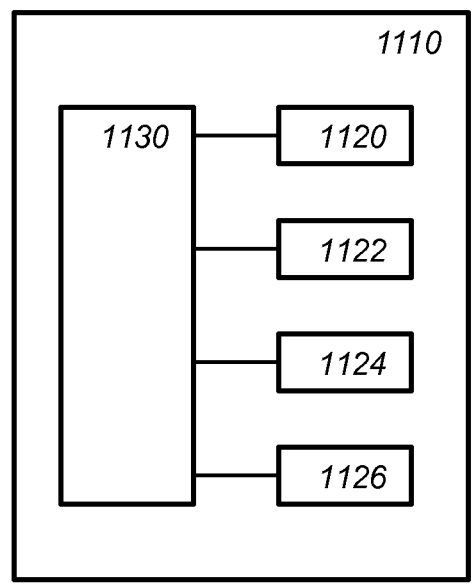

FIG. 5b shows in a schematic representation of a processor system 1100 according to an embodiment. The processor system comprises one or more integrated circuits 1110. The architecture of the one or more integrated circuits 1110 is schematically shown in FIG. 5b. Circuit 1110 comprises a processing unit 1120, e.g., a CPU, for running computer program components to execute a method according to an embodiment and/or implement its modules or units. Circuit 1110 comprises a memory 1122 for storing programming code, data, etc. Part of memory 1122 may be read-only. Circuit 1110 may comprise a communication element 1126, e.g., an antenna, connectors or both, and the like. Circuit 1110 may comprise a dedicated integrated circuit 1124 for performing part or all of the processing defined in the method. Processor 1120, memory 1122, dedicated IC 1124 and communication element 1126 may be connected to each other via an interconnect 1130, say a bus. The processor system 1110 may be arranged for contact and/or contact-less communication, using an antenna and/or connectors, respectively.

The network device and configurator device may advantageously derive the network device identifier from the digital data. This protects the network device from an attacker who impersonates a configuration device. In such a network device and configurator device, the cryptographic hash of the public key may also be derivable from the digital data to protect the credentials but this is not necessary. Advantageous embodiments of such a network device and configurator device are set out in the following clauses. The Applicants hereby give notice that new claims may be formulated to such clauses and/or combinations of such clauses and/or features taken from the description, during prosecution of the present application or of any further application derived therefrom.

Clause 1. An electronic network device (200), the network device comprising:
a key memory (212) storing a cryptographic public key and corresponding private key,
a credential memory (214) for storing credentials after the credentials have been received by the network device,
a wireless communication unit (230) having a master mode and a client mode, the wireless communication unit being configured to enter master mode before the credential memory stores the credentials and to enter client mode after the credential memory stores the credentials, the network device being associated with a network device identifier, the wireless communication unit is configured not to wirelessly transmit the network device identifier before receiving the wireless connection request addressed to the network device identifier,
in the master mode, the wireless communication unit being configured to receive a wireless connection request from a configurator device (300), and, if the connection request is addressed to the network device identifier, establish a first wireless connection 231 with the configurator device,
in the client mode, the wireless communication unit being configured to set up a second wireless connection with a wireless access point (260) using the credentials from the credential memory, and
a provisioning unit (220) configured to
send the public key to the configurator device over the established first wireless 231 connection,
receive encrypted credentials wirelessly from the configurator device, decrypting the encrypted credentials through the private key to obtain the credentials, and storing the credentials in the credential memory, and
a data storage element (250) storing digital data, the network device identifier being derivable from the digital data, wherein
the data storage element is optically readable by the configurator device, or
the data storage element is wirelessly readable by the configurator device and configured for a second wireless communication protocol different from the first wireless communication protocol.

Clause 2. An electronic configurator device for provisioning a network device, the configurator device comprising:
a credential memory (314) storing credentials for establishing a second wireless connection with a wireless access point,
a reader unit (350) arranged to read digital data from a data storage element of the network device, the reader unit (350) is arranged to derive the network device identifier from the digital data,
a wireless communication unit (330) configured to
send a wireless connection request to the network device, the network device being associated with a network device identifier, the wireless communication unit being configured to address the wireless connection request to the network device identifier derived from the digital data, the connection request comprising the network device identifier, and establishing a first wireless connection with the network device, and
a provisioning unit (320) configured to receiving the public key from the network device over the established first wireless connection, encrypting the credentials through the public key, sending said encrypted credentials wirelessly to the network device over the established first wireless connection.

It should be noted that the above-mentioned embodiments illustrate rather than limit the invention, and that those skilled in the art will be able to design many alternative embodiments.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

In the claims references in parentheses refer to reference signs in drawings of embodiments or to formulas of embodiments, thus increasing the intelligibility of the claim. These references shall not be construed as limiting the claim.

The invention claimed is:

1. An electronic network device, the network device comprising:
    a key memory storing a cryptographic public key and corresponding private key,
    a credential memory for storing credentials after the credentials have been received by the network device,
    a wireless communication unit having a master mode and a client mode, the wireless communication unit being configured to enter master mode before the credential memory stores the credentials and to enter client mode after the credential memory stores the credentials, the network device being associated with a network device identifier, the wireless communication unit being configured for a first wirelessly communication protocol,
    in the master mode, the wireless communication unit being configured to receive a wireless connection request from a configurator device, and, if the connection request is addressed to the network device identifier, establish a first wireless connection with the configurator device,
    in the client mode, the wireless communication unit being configured to set up a second wireless connection with a wireless access point using the credentials from the credential memory,
    a provisioning unit configured to
        send the public key to the configurator device over the established first wireless connection,
        receive encrypted credentials wirelessly from the configurator device, decrypting the encrypted credentials through the private key to obtain the credentials, and storing the credentials in the credential memory, and
    a data storage element storing digital data, a cryptographic hash of the public key being derivable from the digital data, wherein
        the data storage element is optically readable by the configurator device and wherein a reader unit is arranged to optically read the data storage element, or
        the data storage element is wirelessly readable by the configurator device and configured for a second wireless communication protocol different from a first wireless communication protocol, and wherein the reader unit is arranged to wirelessly read the data storage element over the second wireless communication protocol.

2. The network device as in claim 1, wherein the network device is a lamp, the lamp comprises a controlling unit configured to receive digital commands for controlling a light source of the lamp through the wireless communication unit, at least when the wireless communication unit is in the client mode.

3. The network device as in claim 1, wherein
    the wireless communication unit is configured not to wirelessly transmit the network device identifier over the first wirelessly communication protocol before receiving the wireless connection request addressed to the network device identifier, and
    the network device identifier being derivable from the digital data.

4. The network device as in claim 3, wherein the digital data comprises the hash of the network device's public key, the network device identifier being derivable from the hash.

5. The network device as in claim 4, wherein the network device identifier is derivable from the hash by grouping the hash into a sequence of smaller length bit strings and converting each bit string to a character of the network device identifier.

6. The network device as in claim 1, wherein the data storage element has a capacity of less than or equal to 256 bits.

7. The network device as in claim 1, wherein
    decrypting the encrypted credentials through the private key to obtain the credentials comprises:
        decrypting the encrypted credentials with the private key, or
        receive encrypted key data through the first wireless connection from the configurator device, decrypting the encrypted key data with the private key obtaining key data, deriving a symmetric key from the key data and decrypting the encrypted credentials with the symmetric key.

8. The network device as in claim 2, wherein the controlling unit is configured to receive said digital commands encrypted with the public key or with a symmetric key obtained through the public key.

9. An electronic configurator device for provisioning a network device, the configurator device comprising:
    a credential memory storing credentials for establishing a second wireless connection with a wireless access point,
    a wireless communication unit configured to
        send a wireless connection request to the network device, the network device being associated with a network device identifier, the connection request comprising the network device identifier, and establishing a first wireless connection with the network device,
    a reader unit arranged to read digital data from a data storage element of the network device, the configurator device being configured to derive a cryptographic hash of the network device's public key, and
    a provisioning unit configured to
        receive the public key from the network device over the established first wireless connection, compute a hash for the public key received from the network device, and verify that said computed hash equals said derived hash only if said verification is successful, sending the credentials encrypted through the public key wirelessly to the network device over the established first wireless connection, wherein:

the data storage element is optically readable by the configurator device and wherein the reader unit is arranged to optically read the data storage element, or the data storage element is wirelessly readable by the configurator device and configured for a second wireless communication protocol different from a first wireless communication protocol, and wherein the reader unit is arranged to wirelessly read the data storage element over the second wireless communication protocol.

10. The electronic configurator device as in claim 9, wherein the reader unit is arranged to derive the network device identifier from the digital data, the wireless communication unit being configured to address the wireless connection request to the network device identifier derived from the digital data.

11. The electronic configurator device as in claim 9, wherein the configurator device is configured to control the network device by encrypting a digital command with the public key or with a symmetric key obtained through the public key and send said encrypted command to the network device via the access point.

12. A network device method, the network device method comprising:

entering a wireless communication unit to master mode before a credential memory stores credentials, entering the wireless communication unit to client mode after the credential memory stores the credentials, in the master mode, wirelessly communicating over a first wirelessly communication protocol:

receiving a wireless connection request from a configurator device, and, if the connection request is addressed to the network device identifier, establish a first wireless connection with the configurator device, sending a public key to the configurator device over the established wireless connection, and receiving encrypted credentials wirelessly from the configurator device, decrypting the encrypted credentials through a private key corresponding to the public key to obtain the credentials, and storing the credentials in the credential memory in the client mode, setting up a second wireless connection with a wireless access point using said credentials, and storing digital data in a data storage element, a cryptographic hash of the public key being derivable from the digital data, wherein the data storage element is optically readable by the configurator device and wherein a reader unit is arranged to optically read the data storage element, or the data storage element is wirelessly readable by the configurator device and configured for a second wireless communication protocol different from a first wireless communication protocol, and wherein the reader unit is arranged to wirelessly read the data storage element over the second wireless communication protocol.

13. An electronic configuration method for provisioning a network device, the method comprising:

reading digital data from a data storage element of the network device, deriving a cryptographic hash of a public key from the digital data, sending a wireless connection request to the network device, the network device being associated with a network device identifier, the connection request comprising the network device identifier, and establishing a first wireless connection with the network device, receiving the public key from the network device over the established first wireless connection, computing a hash for the received public key, and verifying that said computed hash equals said derived hash, only if said verification is successful, sending credentials encrypted through the public key wirelessly to the network device, the credentials being used to establish a second wireless connection with a wireless access point, wherein:

the data storage element is optically readable by the configurator device and wherein a reader unit is arranged to optically read the data storage element, or the data storage element is wirelessly readable by the configurator device and configured for a second wireless communication protocol different from a first wireless communication protocol, and wherein the reader unit is arranged to wirelessly read the data storage element over the second wireless communication protocol.

14. A non-transitory computer readable medium comprising computer program instructions embodied therein, the program instructions, when executed on one or more processors, causing a computer to perform an electronic configuration method for provisioning a network device, the method comprising:

reading digital data from a data storage element of the network device, deriving a cryptographic hash of a public key from the digital data, sending a wireless connection request to the network device, the network device being associated with a network device identifier, the connection request comprising the network device identifier, and establishing a first wireless connection with the network device, receiving the public key from the network device over the established first wireless connection, computing a hash for the received public key, and verifying that said computed hash equals said derived hash, only if said verification is successful, sending credentials encrypted through the public key wirelessly to the network device, the credentials being used to establish a second wireless connection with a wireless access point, wherein:

the data storage element is optically readable by the configurator device and wherein a reader unit is arranged to optically read the data storage element, or the data storage element is wirelessly readable by the configurator device and configured for a second wireless communication protocol different from a first wireless communication protocol, and wherein the reader unit is arranged to wirelessly read the data storage element over the second wireless communication protocol.

\* \* \* \* \*